(12) United States Patent
Lindhé et al.

(10) Patent No.: US 10,209,080 B2
(45) Date of Patent: Feb. 19, 2019

(54) ROBOTIC CLEANING DEVICE

(71) Applicant: Aktiebolaget Electrolux, Stockholm (SE)

(72) Inventors: Magnus Lindhé, Stockholm (SE);
Anders Haegermarck, Trångsund (SE);
Petter Forsberg, Stockholm (SE)

(73) Assignee: Aktiebolaget Electrolux (SE)

( * ) Notice: Subject to any disclaimer, the term of this patent is extended or adjusted under 35 U.S.C. 154(b) by 0 days.

(21) Appl. No.: 15/100,667

(22) PCT Filed: Dec. 19, 2013

(86) PCT No.: PCT/EP2013/077377
§ 371 (c)(1),
(2) Date: Jun. 1, 2016

(87) PCT Pub. No.: WO2015/090397
PCT Pub. Date: Jun. 25, 2015

(65) Prior Publication Data
US 2016/0298970 A1 Oct. 13, 2016

(51) Int. Cl.
*G01C 21/20* (2006.01)
*A47L 11/24* (2006.01)
(Continued)

(52) U.S. Cl.
CPC ............ *G01C 21/206* (2013.01); *A47L 11/24* (2013.01); *A47L 11/4011* (2013.01);
(Continued)

(58) Field of Classification Search
CPC .... G01C 21/206; A47L 11/24; A47L 11/4011; A47L 11/4066; A47L 11/4041;
(Continued)

(56) References Cited

U.S. PATENT DOCUMENTS 1,286,321 A   12/1918   Hoover
1,401,007 A   12/1921   Staples
(Continued)

FOREIGN PATENT DOCUMENTS

CA   2154758   6/1995
CN   1116818   2/1996
(Continued)

OTHER PUBLICATIONS

International Search Report and Written Opinion of the International Searching Authority for International Application No. PCT/EP2014/069073, dated May 12, 2015, 10 pages.
(Continued)

*Primary Examiner* — Courtney D Heinle
(74) *Attorney, Agent, or Firm* — RatnerPrestia

(57) ABSTRACT

A robotic cleaning device having a body, and an obstacle detecting device configured to obtain data from a vicinity of the robotic cleaning device. The robotic cleaning device further has a propulsion system configured to drive the robotic cleaning device across a surface to be cleaned, and a cleaning member. The device also has a processing unit arranged to extract at least one feature from data obtained by the obstacle detecting device, compare the attained feature with stored features and when the attained feature matches one of the stored features, deduce a position of the robotic cleaning device.

17 Claims, 3 Drawing Sheets

(51) Int. Cl.
    *A47L 11/40* (2006.01)
    *B60L 11/18* (2006.01)
    *G05D 1/02* (2006.01)
(52) U.S. Cl.
    CPC ....... *A47L 11/4041* (2013.01); *A47L 11/4066* (2013.01); *B60L 11/1809* (2013.01); *G05D 1/0248* (2013.01); *G05D 1/0274* (2013.01); *A47L 2201/06* (2013.01); *G05D 2201/0215* (2013.01); *Y10S 901/01* (2013.01); *Y10S 901/46* (2013.01)
(58) Field of Classification Search
    CPC .......... A47L 2201/06; G05D 1/0248; G05D 1/0274; G05D 2201/0215; B60L 11/1809; Y10S 901/01; Y10S 901/46
    See application file for complete search history.

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A | 11/1994 | Roberts et al. |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist et al. |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |

(56) References Cited

U.S. PATENT DOCUMENTS

| | | |
|---|---|---|
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer et al. |
| 7,053,580 B2 | 5/2006 | Aldred |
| 7,053,678 B2 | 5/2006 | Diehl et al. |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |

(56) References Cited

U.S. PATENT DOCUMENTS

| | | |
|---|---|---|
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi et al. |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |

(56) References Cited

U.S. PATENT DOCUMENTS

| | | |
|---|---|---|
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swell |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo et al. |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,881,339 B2 | 11/2014 | Gilbert, Jr. et al. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah et al. |
| 9,033,079 B2 | 5/2015 | Shin |
| 9,037,396 B2 | 5/2015 | Pack |
| 9,144,361 B2 | 9/2015 | Landry |
| 9,360,300 B2 | 6/2016 | DiBernado |
| 10,045,675 B2 | 8/2018 | Haegermarck |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |

(56) References Cited

U.S. PATENT DOCUMENTS

| | | |
|---|---|---|
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun et al. |
| 2007/0114975 A1 | 5/2007 | Cohen |
| 2007/0118248 A1 | 5/2007 | Lee et al. |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer et al. |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein et al. |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |

(56) References Cited

U.S. PATENT DOCUMENTS

| | | |
|---|---|---|
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto et al. |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley et al. |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1* | 4/2011 | Escrig ............... G05D 1/0246 703/1 |
| 2011/0088609 A1 | 4/2011 | Vosburgh |
| 2011/0109549 A1 | 5/2011 | Robbins |
| 2011/0125323 A1 | 5/2011 | Gutmann et al. |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1* | 7/2012 | Schnittman ............. A47L 9/106 340/540 |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1* | 2/2013 | Wong .................. B66F 9/063 701/408 |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon et al. |

(56) References Cited

U.S. PATENT DOCUMENTS

| | | |
|---|---|---|
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung et al. |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh et al. |
| 2013/0340201 A1 | 12/2013 | Jang et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1 | 1/2015 | Kim et al. |
| 2015/0039127 A1 | 2/2015 | Matsumoto |
| 2015/0057800 A1 | 2/2015 | Cohen |
| 2015/0197012 A1 | 7/2015 | Schnittman |
| 2015/0206015 A1 | 7/2015 | Ramalingam et al. |
| 2015/0265122 A1 | 9/2015 | Han et al. |
| 2016/0306359 A1 | 10/2016 | Lindhe et al. |
| 2016/0316982 A1 | 11/2016 | Kim et al. |
| 2017/0273521 A1 | 9/2017 | Klintemyr et al. |
| 2017/0273524 A1 | 9/2017 | Klintemyr et al. |
| 2018/0103812 A1 | 4/2018 | Lee et al. |

FOREIGN PATENT DOCUMENTS

| | | | |
|---|---|---|---|
| CN | 1668238 A | | 9/2005 |
| CN | 101161174 A | | 4/2008 |
| CN | 101297267 A | | 10/2008 |
| CN | 102083352 A | | 6/2011 |
| CN | 103027634 | | 4/2013 |
| CN | 103054516 A | | 4/2013 |
| CN | 103491838 A | | 1/2014 |
| CN | 103565373 A | | 2/2014 |
| DE | 0142594 | | 5/1985 |
| DE | 3536907 | | 4/1986 |
| DE | 9307500 | | 7/1993 |
| DE | 4211789 | | 10/1993 |
| DE | 4340367 | | 6/1995 |
| DE | 4439427 A1 | | 5/1996 |
| DE | 19849978 | | 5/2000 |
| DE | 102010000174 | | 7/2011 |
| DE | 102010000573 | | 9/2011 |
| DE | 102010037672 | | 3/2012 |
| EP | 0358628 | | 3/1990 |
| EP | 0474542 | | 3/1992 |
| EP | 0569984 | | 11/1993 |
| EP | 0606173 | | 7/1994 |
| EP | 1099143 | | 11/2003 |
| EP | 1360922 A2 | | 11/2003 |
| EP | 1441271 | | 7/2004 |
| EP | 1331537 | | 8/2005 |
| EP | 2050380 | | 4/2009 |
| EP | 1969438 | | 9/2009 |
| EP | 1395888 | | 5/2011 |
| EP | 2316322 | | 5/2011 |
| EP | 2296005 | | 6/2011 |
| EP | 2251757 | | 11/2011 |
| EP | 2417894 | | 2/2012 |
| EP | 2438843 | | 4/2012 |
| EP | 2466411 A2 | | 6/2012 |
| EP | 2561787 | | 2/2013 |
| EP | 2578125 | | 4/2013 |
| EP | 2583609 | | 4/2013 |
| EP | 2604163 | | 6/2013 |
| EP | 2447800 | | 4/2014 |
| EP | 2741483 | | 6/2014 |
| EP | 2772815 | | 9/2014 |
| EP | 2884364 A1 | | 6/2015 |
| FR | 2999416 | | 6/2014 |
| GB | 2355523 | | 4/2001 |
| GB | 2 382 251 | * | 5/2003 |
| GB | 2494446 | | 3/2013 |
| GB | 1447943 | | 10/2013 |
| JP | 5540959 | | 3/1980 |
| JP | 6286414 | | 4/1987 |
| JP | 62109528 | | 5/1987 |
| JP | 62120510 | | 6/1987 |
| JP | 62152421 | | 7/1987 |
| JP | 62152424 | | 7/1987 |
| JP | 63127310 A | | 5/1988 |
| JP | 63181727 | | 7/1988 |
| JP | 63241610 | | 10/1988 |
| JP | 03162814 A | | 7/1991 |
| JP | 03166074 | | 7/1991 |
| JP | 04260905 | | 9/1992 |
| JP | 0584200 | | 4/1993 |
| JP | 0584210 | | 4/1993 |
| JP | 05084200 | | 4/1993 |
| JP | 05189041 | | 7/1993 |
| JP | 05224745 | | 9/1993 |
| JP | 05228090 | | 9/1993 |
| JP | 064133 | | 1/1994 |
| JP | 0683442 A | | 3/1994 |
| JP | 06125861 | | 5/1994 |
| JP | 06144215 | | 5/1994 |
| JP | 06179145 | | 6/1994 |
| JP | 075922 | | 1/1995 |
| JP | 0759695 | | 3/1995 |
| JP | 0732752 B2 | | 4/1995 |
| JP | 07129239 A | | 5/1995 |
| JP | 07281742 | | 10/1995 |
| JP | 08089455 | | 4/1996 |
| JP | 08326025 | | 12/1996 |
| JP | 0944240 | | 2/1997 |
| JP | 09150741 | | 6/1997 |
| JP | 09185410 | | 7/1997 |
| JP | 11267074 | | 10/1999 |
| JP | 2001022443 | | 1/2001 |

(56) References Cited

FOREIGN PATENT DOCUMENTS

| | | |
|---|---|---|
| JP | 2001187009 | 7/2001 |
| JP | 2002182742 A | 6/2002 |
| JP | 2002287824 A | 10/2002 |
| JP | 2002355204 | 12/2002 |
| JP | 2002366228 | 12/2002 |
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005040597 a | 2/2005 |
| JP | 2005124753 A | 5/2005 |
| JP | 2005141636 A | 6/2005 |
| JP | 2005314116 A | 11/2005 |
| JP | 2006015113 A | 1/2006 |
| JP | 2006087507 | 4/2006 |
| JP | 2006185438 A | 7/2006 |
| JP | 2006231477 | 9/2006 |
| JP | 2006314669 | 11/2006 |
| JP | 2007014369 A | 1/2007 |
| JP | 2007070658 | 3/2007 |
| JP | 2007143645 A | 6/2007 |
| JP | 2007213236 A | 8/2007 |
| JP | 2007226322 A | 9/2007 |
| JP | 2007272665 A | 10/2007 |
| JP | 2008132299 A | 6/2008 |
| JP | 2008146617 A | 6/2008 |
| JP | 2008290184 | 12/2008 |
| JP | 2008543394 A | 12/2008 |
| JP | 2009509220 | 3/2009 |
| JP | 2009193240 A | 8/2009 |
| JP | 2010507169 A | 3/2010 |
| JP | 2010079869 A | 4/2010 |
| JP | 2010526594 | 8/2010 |
| JP | 2010534825 A | 11/2010 |
| JP | 2011045694 | 3/2011 |
| JP | 2011253361 A | 12/2011 |
| JP | 2012216051 A | 11/2012 |
| JP | 2013041506 A | 2/2013 |
| JP | 2013089256 A | 5/2013 |
| JP | 2013247986 A | 12/2013 |
| JP | 2014023930 A | 2/2014 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 A2 | 11/2001 |
| WO | 03022120 | 3/2003 |
| WO | 03024292 | 3/2003 |
| WO | 03026474 A2 | 4/2003 |
| WO | 2004006034 A2 | 1/2004 |
| WO | 2004082899 | 9/2004 |
| WO | 2007008148 | 1/2007 |
| WO | 2007028049 | 3/2007 |
| WO | WO 2007/051972 * | 5/2007 |
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2015016580 | 2/2015 |

OTHER PUBLICATIONS

International Search Report and Written Opinion of the International Searching Authority for International Application No. PCT/EP2014/069074, dated May 11, 2015, 10 pages.
Non Final Office Action for U.S. Appl. No. 14/409,291, dated Dec. 28, 2016,, 61 pages.
Non Final Office Action for U.S. Appl. No. 15/101,257, dated Feb. 10, 2017, 10 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Collins, et al. "Cerebellar Control of a Line Following Robot", Computer Science and Electrical Engineering Department, University of Queensland, St.Lucia, Queensland, 4072 A, pp. 1-6.
Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series—Research Triangle Park—Raleigh, NC, Oct. 22-24, 1993, pp. 1-6.
Everett, Sensors for Mobile Robots Theory and Application, A.K. Peters, 1995, Chapters 1 and 3, 70 pages.
Everett, Sensors for Mobile Robots Theory and Application, A.K. Peters, Ltd., 1995, Chapters 6, 7 and 10, 79 pages.
Everett, Sensors for Mobile Robots Theory and Application, A.K. Peters, Ltd., 1995, Chapters, 4 and 5, 68 pages.
Everett, Sensors for Mobile Robots Theory and Application, A.K. Peters, Ltd., 1995, Chapters 15 and 16, 59 pages.
Everett, et al. "Survey of Collision Avoidance and Ranging Sensors for Mobile Robots", Revision 1, Technical Report 1194, Dec. 1992, pp. 1-154.
Gavrilut, et al. "Wall-Following Method for an Autonomous Mobile Robot using Two IR Sensors", 12th WSEAS International Conference on SYSTEMS, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.

(56) References Cited

OTHER PUBLICATIONS

International Search Report and Written Opinion of the International Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5 pages.
International Search Report for International Application No. PCT/EP2013/057815 dated Apr. 2, 2014, 4 pages.
International Search Report for International Application No. PCT/EP2013/067500 dated Dec. 10, 2013, 4 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 6 and 9, 56 pages.
Jones et al. Mobile Robots Inspiration to Implementation, Second Edition, A.K. Peters, Ltd., 1999, Chapters 1 and 5, 72 pages.
Jones et al., Mobile Robots Inspiration to Implementation, Second Edition, A.K. Peters, Ltd., 1999, Chapters 10 and 11, 45 pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—A case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref, et al. "Sensor-based navigation of a mobile robot in an indoor environment", Robotics and Autonomous Systems, 2002, Elsevier, 18 pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Notice of Allowance for U.S. Appl. No. 14/409,291, dated Jun. 16, 2016, 13 pages.
Oren, Reply to Office Action dated Jun. 23, 2014, U.S. Appl. No. 13/757,985, pp. 1-10.

Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, Technical Report TR/IRIDIA/ 95 25, Cover page + pp. 1-14.
Written Opinion for International Application No. PCT/EP2013/067500 dated Dec. 10, 2013, 7 pages.
Yamamoto, "Sozzy: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
International Search Report and Writtent Opinion of the International Searching Authority for International Application No. PCT/EP2014/078144, 7 pages.
Extended European Search Report for European Application No. 16176479.0, dated Nov. 11, 2016, 9 pages.
International Search Report and Written Opinion of the International Searching Authority for International Application No. PCT/EP2014/069074, dated May 11, 2015, 9 pages.
Notice of Allowance for U.S. Appl. No. 14/409,291, dated Sep. 18, 2017, 8 pages.
Notice of Reasons for Rejection for Japanese Application No. 2016-526764, dated Aug. 25, 2017 with translation, 6 paes.
Notification of Reasons for Rejection for Japanese Application No. 2016-526765, dated Aug. 25, 2017 with translation, 7 pages.
Notifcation of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.
Non Final Office Action for U.S. Appl. No. 15/101,212, dated May 17, 2017, 8 pages.
Final Office Action for U.S. Appl. No. 14/409,291, dated Jun. 6, 2017, 21 pages.
Non Final Office Action for U.S. Appl. No. 15/101,235 dated Apr. 21, 2017, 10 pages.
Japanese Office Action forApplication for Japanese Application No. 2015-528969, dated Apr. 7, 2017 with translation, 4 pages.
Notice of Allowance for U.S. Appl. No. 15/101,257, dated Jul. 6, 2017, 9 pages.
International Search Report and Written Opinion of the International Searching Authority for International Application No. PCT/EP2015/058377, dated Aug. 10, 2016, 15 pages.
Non Final Office Action for Application No. 15/102,015, dated Aug. 17, 2017, 13 pages.
Chinese Office Action for Chinese Application No. 201380075503.9, dated Nov. 8, 2017 with translation, 16 pages.
European Communication Pursuant to Article 94(3) for European Application No, 16176479.0, dated Nov. 27, 2017, 6 pages.
International Search Report and Written Opinion for International Application No. PCT/EP2015/070140, dated May 27, 2016, 11 pages.
Non Final Office Action for U.S. Appl. No. 15/102,017, dated Feb. 16, 2018, 12 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notification of Reasons for Rejection for Japanese Application No. 2016-526947, dated Sep. 21, 2017 with translation, 8 pages.
European Communication Pursuant to Article 94(3) for European Application No. 13817911.4, dated Jan. 15, 2018, 8 pages.
Notice of Allowance for U.S. Appl. No. 15/102,015, dated Dec. 11, 2017, 8 pages.
Non Final Office Action for U.S. Appl. No. 15/101,235, dated Nov. 1, 2017, 11 pages.
Non Final Office Action for U.S. Appl. No. 14/784,106, dated Oct. 19, 2017, 11 pages.
Final Office Action for U.S. Appl. No. 15/101,212, dated Oct. 11, 2017, 7 pages.

(56) References Cited

OTHER PUBLICATIONS

Notification of Reasons for Refusal for Japanese Application No. 2017-501374, dated Mar. 6, 2018 with translation, 8 pages.
Chinese Office Action for Chinese Application No. 201380081535.X, dated Mar. 26, 2018 with translation, 18 pages.
Chinese Office Action for Chinese Application No. 201380081103.9, dated Feb. 27, 2018 with translation, 19 pages.
Non Final Office Action for U.S. Appl. No. 15/101,515, dated Apr. 18, 2018, 14 pages.
Notice of Allowance for U.S. Appl. No. 15/101,212, dated Apr. 11, 2018, 9 pages.
Final Office Action for U.S. Appl. No. 14/784,106, dated Mar. 28, 2018, 8 pages.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.
Final Office Action for U.S. Appl. No. 15/102,107, dated Jun. 14, 2018, 12 pages.
Non Final Office Action for U.S. Appl. No. 15/101,235, dated Jun. 14, 2018, 11 pages.
Japanese Office Action for Japanese Application No. 2016-506795, dated Feb. 7, 2017 with translation, 6 pages.
Chinese Office Action for Chinese Application No. 20130075510.9, dated Feb. 6, 2017 with translation, 14 pages.
Japanese Office Action for Japanese Application No. 2016-506794, dated Feb. 7, 2017 with translation, 10 pages.
Chinese Office Action for Chinese Application No. 201380075503.9, dated Febraury 13, 2017 with translation, 18 pages.
Interational Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19 pages.
International Search Report and Written Opinion of the International Searching Authority for Internatonal Applicaion No. PCT/EP2014/0077142, dated Sep. 11, 2015, 8 pages.
Chung et al., "Path Planning for a Mobile Robot With Grid Type World Model", Proceedings of the 1992 IEEE/RSJ International Conference on Intelligent Robots and Systems, Jul. 7-10, 1992, pp. 439-444.
Non Final Office Action for U.S. Appl. No. 15/101,510, dated Jul. 27, 2018, 17 pages.
Non Final Office Action for U.S. Appl. No. 14/784,110, dated Aug. 16, 2018, 13 pages.
Chinese Office Action for Chinese Application No. 201380081537.9, dated Jun. 4, 2018 with translation, 15 pages.
Notice of Allowance for U.S. Appl. No. 15/102,295, dated Sep. 24, 2018, 9 pages.
Notice of Allowance for U.S. Appl. No. 15/101,515, dated Aug. 28, 2018, 11 pages.
Notice of Allowance for U.S. Appl. No. 14/784,106, dated Oct. 11, 2018, 7 pages.
Notification of Reasons for Refusal of Japanese Application No. 2016-568949, dated Oct. 9, 2018 with translation, 6 pages.
Non Final Office Action for U.S. Appl. No. 15/321,333, dated Oct. 24, 2018, 10 pages.
Position_Definition of Position by Merriam-Webster.pdf (Position | Definition of Position by Merriam-Webster, Oct. 16, 2018, Merriam_webster, http://www.webster.com/dictionary/position, pp. 1-15.
Gutman et al., AMOS: Comparison of Scan Matching Approaches for Self-Localization in Indoor Environments, 1996, IEEE, pp. 61-67.
Non Final Office Action for U.S. Appl. No. 15/504,071, dated Nov. 2, 2018, 17 pages.
Non Final Office Action for U.S. Appl. No. 15/504,066, dated Nov. 5, 2018, 18 pages.
Entended European Search Report for Application No. 18157403.9-1018/3357393 dated Nov. 14, 2018, 12 pages.

\* cited by examiner

ROBOTIC CLEANING DEVICE

This application is a U.S. National Phase application of PCT International Application No. PCT/EP2013/077377, filed Dec. 19, 2013, which is incorporated by reference herein.

TECHNICAL FIELD

The invention relates to a robotic cleaning device and to methods of operating and teaching the robotic cleaning device to recognize and to associate specific types of markers and their features with a specific area or room and control its operation accordingly.

BACKGROUND

Robotic vacuum cleaners such as for example robotic vacuum cleaners are known in the art. In general robotic vacuum cleaners are equipped with drive arrangement in the form of a motor for moving the cleaner across a surface to be cleaned. The robotic vacuum cleaners are further equipped with intelligence in the form of microprocessor(s) and navigation means for causing an autonomous behaviour such that the robotic vacuum cleaners freely can move around and clean a space in the form of e.g. a room.

In many fields of technology, it is desirable to use robots with an autonomous behaviour such that they freely can move around a space without colliding with possible obstacles.

It is a desire to support the navigation and positioning of a robotic vacuum cleaner, especially within complex environments and surfaces to be cleaned. The navigation and positioning may thus be improved by using artificial markers or artificial landmarks.

As an a example, robotic vacuum cleaners exist in the art with the capability of more or less autonomously vacuum cleaning a room in which furniture such as tables and chairs and other obstacles such as walls and stairs are located. Traditionally, these robotic vacuum cleaners have navigated a room by means of using e.g. ultrasound or light waves or laser beams. Further, the robotic vacuum cleaners typically must be complemented with additional sensors, such as stair sensors, wall-tracking sensors and various transponders to perform accurately. Such sensors are expensive and affect the reliability of the robot.

A large number of prior art robotic vacuum cleaner use a technology referred to as Simultaneous Localization and Mapping (SLAM). SLAM is concerned with the problem of building a map of an unknown environment by a mobile robotic vacuum cleaner while at the same time navigating the environment using the map. This is typically combined with a horizontally scanning laser for range measurement. Further, odometry is used to provide an approximate position of the robot as measured by the movement of the wheels of the robot.

US 2002/0091466 discloses a mobile robot with a first camera directed toward the ceiling of a room for recognizing a base mark on the ceiling and a line laser for emitting a linear light beam toward an obstacle, a second camera for recognizing a reflective linear light beam from the obstacle. The line laser emits a beam in the form of straight line extending horizontally in front of the mobile robot.

The use of a base mark on the ceiling and markers on the ceiling in general poses certain disadvantages. First, the robot will need to have two cameras with at least one camera "looking" up towards the ceiling and another camera looking in the direction of movement and thus in the direction of the laser beams from the horizontal line laser, this is expensive and complicates the build up of the robot. Further, the user has to position at least one base mark on the ceiling by using a chair or ladder.

In addition if the robotic vacuum cleaner can only rely on natural landmarks or markers within a surface to be cleaned, or if the environment is too sterile, too repetitive, thus if the signature of the environment is not rich enough, the robotic cleaning device may run into problems during the navigation and when it tries to identify its current position.

It is further difficult to communicate special information to the robotic cleaning device.

SUMMARY

An object of the present invention is to solve the above mentioned problems and to provide a robotic cleaning device that can navigate and position itself accurately, that is efficient in its use and that provides a high flexibility to the user.

A further object of the present invention is to provide a robotic cleaning device that supports an efficient electric recharging of a robotic cleaning device by a charging station and that enables the robotic cleaning device to easily find and recognize the charging station.

Another object of the present invention is to provide methods of teaching and operating the robotic cleaning device which allows an easy set up, which methods enhance the programmability of the cleaning performed by the robotic cleaning device and which later on enhances the accuracy of the cleaning operation.

The above mentioned objects are solved by a robotic cleaning device and by methods of teaching and operating a robotic cleaning device, as claimed in the independent claims.

Disclosed herein is a robotic cleaning device comprising a body, an obstacle detecting device configured to obtain data from a vicinity of the robotic cleaning device. The robotic cleaning device comprises further a cleaning member and a propulsion system, said propulsion system being configured to drive the robotic cleaning device across a surface to be cleaned, wherein a processing unit is arranged to extract and attain at least one feature from said data obtained by the obstacle detecting device and compare the attained feature with stored features and when the attained feature matches one of the stored features, deduce a position of the robotic cleaning device.

Disclosed herein is further in an embodiment of the present invention a robotic cleaning device comprising a body, an obstacle detecting device in the form of a three dimensional (3D) sensor system, said 3D sensor system comprising a camera being configured to record an image of at least a portion of the vicinity of the robotic cleaning device. The 3D sensor system and the camera, respectively, produces data from a vicinity of the robotic cleaning device in the form of recorded images, from which the processing unit is configured to extract the at least one feature from said image in order to attain the feature and its position, compare the attained feature with stored features and, when the attained feature matches one of the stored feature, deduce a position of the robotic cleaning device.

The stored features may be stored in a database, which is integrated or at least connected to a processing unit of the obstacle detecting device.

The obstacle detection device may comprise a 3D sensor system, which 3D sensor system may be a laser scanner, a camera, a radar, etc.

The robotic cleaning device may thus perform a cleaning operation by constantly observing and recording its vicinity while moving around on the surface to be cleaned. When one of its many attained features match a stored feature, the robotic cleaning device may perform an operation based on an instruction associated with the stored feature. Thus it may be possible to associate a stored feature, for example "kitchen", with the instruction "do not clean", which will make the robotic cleaning device not cleaning the kitchen as soon as one of its attained features does match the specific stored feature "kitchen". The stored feature kitchen may either be derived from a specific, artificial 3D marker or from recognizing the specific feature from the fridge, stove, etc.

The 3D sensor system may comprise a camera device configured to record images of a vicinity of the robotic cleaning device; and a first and second vertical line lasers configured to illuminate said vicinity of the robotic cleaning device.

The processing unit may further be configured to derive the positional data from the recorded images.

The 3D or vertical markers may be natural or artificial markers.

The attained features and the stored features may be derived from 3D markers. The position of the 3D markers and thus the robotic cleaning device may also be derived from the recorded images.

Once the robotic cleaning device has build up a map of the surface to be cleaned, it will start to remember or attain where the stored features and the associated rooms are located and the user may command the robotic cleaning device to clean the "bathroom", which will lead to the robotic cleaning device going straight to the bathroom and clean it.

Disclosed herein is further a method of teaching a robotic cleaning device comprising the steps of:
supplying information regarding markers to the robotic cleaning device;
deriving a feature from each type of marker, storing the generated feature and assigning the stored feature to a specific room or area via an interface arranged on the robotic cleaning device;
positioning the markers in connection to the specific area to which they are assigned; and
programming the robotic cleaning device with instructions assigned to each stored feature.

After the teaching phase the robotic cleaning device may start the cleaning by autonomously moving, recognizing the positioned markers and attaining their features and their position and the corresponding area assigned, comparing the attained feature with the stored features and, when the attained feature matches one of the stored features, controlling its operation or movement according to instructions assigned to the said one stored feature.

The method allows a user to easily install the robotic cleaning device and set it up so that it may operate efficiently basically from when the set up is done. The teaching phase, which may be done when the robotic cleaning device is set to a teaching mode, is comparably short and it enables the user to control the cleaning process easily. For example is it possible for a user to tell the robotic cleaning device not to clean the specific area or room defined as "kitchen", "bedroom" or "bathroom" at a certain time, since you may not want to have your robotic cleaning device in the bedroom at night or in the bathroom when you get ready in the morning. Further areas which are forbidden for the robotic cleaning device such as the staircase can also be taught to the robotic cleaning device so that it will not go further when it sees the specific vertical marker that was assigned for example to the specific area named "staircase". Each stored feature may be assigned to corresponding instructions, in the case of the staircase this may be "turn around" or "don't go".

The teaching phase may be done in the factory using 3D markers. Each of the 3D markers would then need to tagged with "kitchen", "bathroom", "bedroom", "office", "living room", etc. so that a user only needs to install the 3D markers at an entrance to the corresponding room. The user may then, after positioning the 3D markers, switch on the robotic cleaning device, which will lead to the robotic cleaning device starting to move and clean and at the same time learn about its environment or surface to be cleaned and the position of the 3D markers and their corresponding stored features.

Disclosed herein is another method of operating a robotic cleaning device comprising the steps of:
obtaining data from a vicinity of the robotic cleaning device by an obstacle detecting device;
extracting at least one feature from said data in order to attain said feature and its position by an obstacle detecting device; and
comparing the attained feature with stored features; and
controlling the operation of the robotic cleaning device according to instructions assigned to one of the stored features, when the attained feature matches one of the stored features.

The method allows to perform customized cleanings and to improve the efficiency of the cleaning operation.

The obtained data may by in the form of an image, a picture, a map a 3D representation of the room, etc.

In an embodiment the at least one feature may be attained from at least two reflective elements having a predetermined vertical offset.

The two reflective elements may be used to mark the way to a charging station configured to charge the robotic cleaning device or they may be used to directly mark the charging station.

The vertical offset may be chosen to be in a range of 1 to 10 cm, preferably 2 to cm, more preferably 3 cm.

The may ease the recognition of the reflective markers and their offset, respectively, by the robotic cleaning device.

The above mentioned attained feature may be attained from a vertically arranged bar code.

In a preferred embodiment of the robotic cleaning device, the obstacle detecting device may comprise the 3D sensor system and at least one line laser, which is configured to illuminate the vicinity of the robotic cleaning device.

The line laser improves the recording and the image quality of the 3D sensor system by illuminating the vicinity of the robotic cleaning device.

In an embodiment the at least one line may be a vertical line laser.

This facilitates the build up of a 3D map of the environment the robotic cleaning device is operating in.

In an embodiment the obstacle detecting device of the robotic cleaning device are configured to record images of 3D object markers and derive and attain at least one feature from at least one of the markers.

The 3D markers may preferably be 3D object markers that are at least partially symmetric so that they look the same for the robotic cleaning device from various horizontal directions from the surface to be cleaned.

The at least partially symmetrical 3D object markers may be completely symmetric.

Using 3D object markers improves recognition by the obstacle detecting device and thus the 3D sensor system and the processing unit.

The various types of different vertical markers may be configured as modular sets of vertical and/or horizontal markers that may be extended depending on the size and geometry of a surface that should be cleaned by the robotic cleaning device.

It may be possible that the 3D object markers are everyday articles such as symmetrical floorlamps, symmetrical chess figures, symmetrical vases, symmetrical hall stands, symmetrical candle holders and so on.

This may create opportunities to use design objects as different vertical markers for the robot. Since the robotic cleaning kit is designed as a home appliance the use of everyday articles as vertical markers allows to combine a technical cleaning kit with design features or furniture features, whereby the design features are used and built into the actual technical appliance.

The everyday articles used as vertical markers may need to have a unique, symmetrical shape for easy recognition by the robot.

The 3D markers may be comparably small discreet 3D object markers, which are configured to be glued or stuck to a vertically extending object such as a wall or furniture.

If a user does not want to have comparably big free standing 3D objects such as high vases, hallstands or the like as vertical markers he may use the comparably small discreet 3D objects which can be glued or stuck to the wall. The small 3D objects may have a height from 5 to 20 cm and can be discreetly stuck next to electric outlets, comparably close to the floor. The 3D objects or 3D artificial markers may thus be installed in a range of 0 cm-50 cm from the floor.

The 3D markers or objects may be configured to be stuck close to an entrance, such as a door, gate or corridor in order to "show" the robotic cleaning device which area or room it is about to enter.

In a further embodiment the processing unit may comprise a user interface configured to receive input from a user regarding at least one attained feature derived from at least one of the 3D object markers, in order to generate a stored feature.

The user interface may also be used to give commands to the robotic cleaning device and program it.

In a further embodiment the obstacle detecting device may comprise a second vertical line laser, whereby the first and second vertical line lasers are arranged laterally of the 3D sensor system.

A second vertical line laser may improve the ability of the obstacle detecting device to recognize the vertical markers. The lateral positioning of the vertical line lasers may better illuminate the angle in which the camera is operating.

Further, the vertical line laser may comprise an oscillating or vertically rotating laser beam, which oscillates or rotates with a high frequency, so that said line laser creates a vertical laser plane which vertically projects a vertical laser line across a space or room.

The aforementioned method of operating the robotic cleaning device may further comprise the step of installing different types of markers in close proximity to entrances to different rooms, the robotic cleaning device being configured to recognize and attain features and a position from at least one of the installed markers and control its operation or movement according to instructions assigned to the known feature of the at least one type of marker.

Advantageously the method further comprises the step of installing a charging station and a unique charging station marker in close proximity to the charging station, the robotic cleaning device being configured to recognize and attain the unique charging station marker and its specific feature in order to find its way to the charging station.

As stated above the use of a unique charging station marker improves the ability of the robotic cleaning device to find its way to the charging station. The unique charging station marker may further help the robotic cleaning device to position itself better in order to actually connect to the charging station.

Additionally the method may further comprise the step of programming and teaching a processing unit of the robotic cleaning device via the interface so that only some or one of the specific areas or rooms are/is cleaned at a time.

This gives the user a high flexibility and she/he can adjust the robotic cleaning device according to her/his needs. The user interface may also provide a function with a timer or the like so that the robotic cleaning device does, for example, not clean during the night.

It is noted that the invention relates to all possible combinations of features recited in the claims. Further features of, and advantageous with the present invention will become apparent when studying the appended claims and the following description. Those skilled in the art realize that different features of the present invention can be combined to create embodiments other than those described in the following.

The steps of any method disclosed herein do not have to be performed in the exact order disclosed, unless explicitly stated.

Further the terms recognizable, discoverable, remarkably different, etc. stated herein refer to the ability of the robotic cleaning device and not the ability of a human eye.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 4:
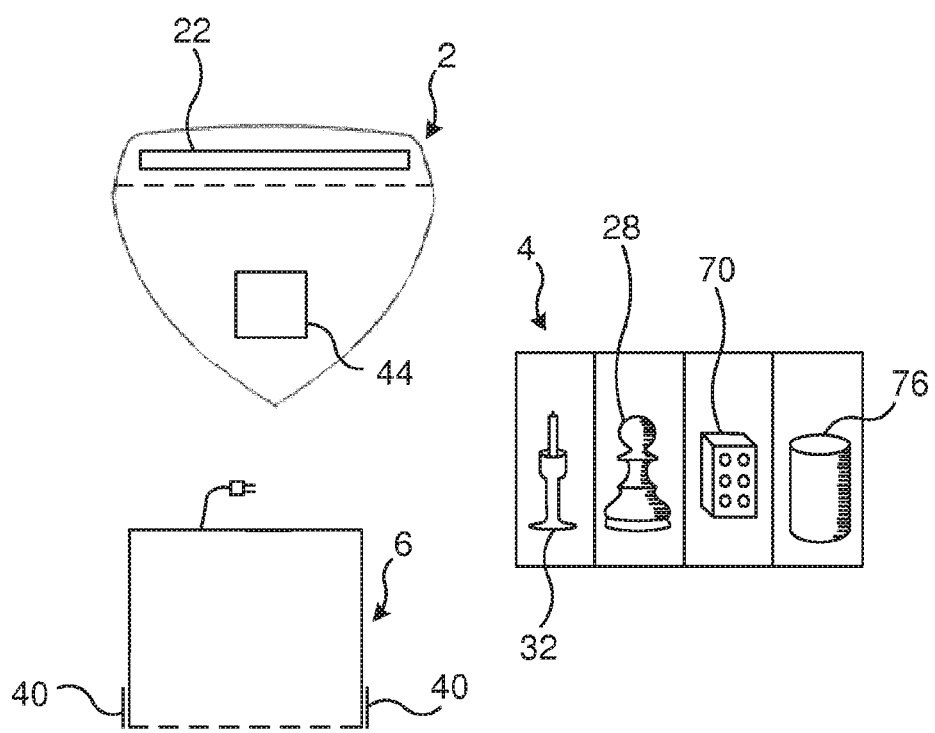
FIG. 4 shows a robotic cleaning kit according to the invention prior to installation.

Referring now to the figures, which show an exemplary embodiment of the invention, a robotic cleaning kit or system 1 comprises a robotic cleaning device 2 and a modular, artificial vertical marker set 4, as illustrated in FIG. 4. The robotic cleaning kit 1 further comprises a charging station 6 configured to recharge a battery (not illustrated) of the robotic cleaning device 2.

Figure 2:
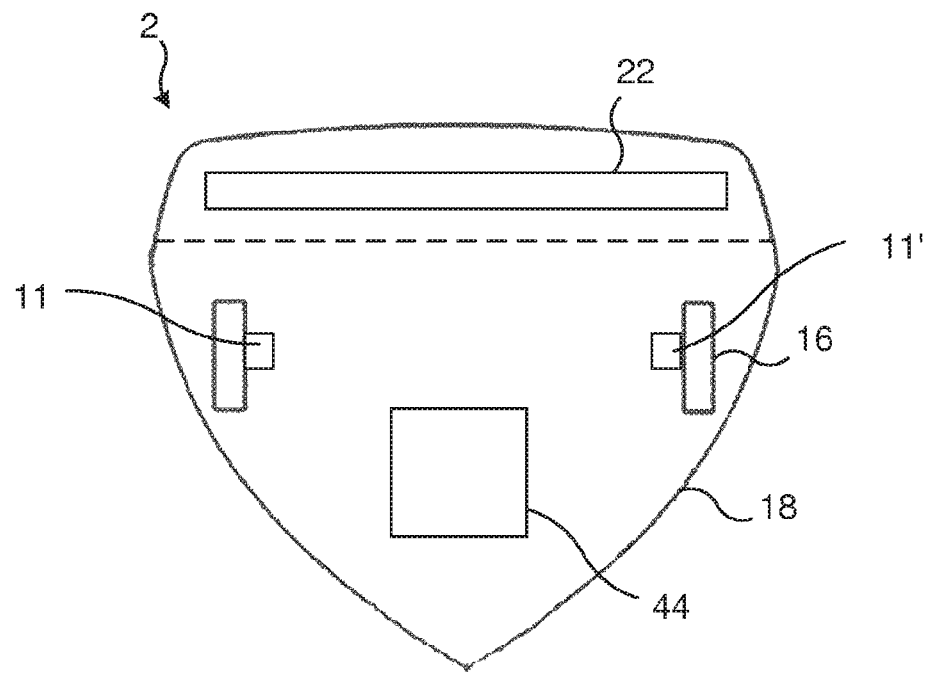
FIG. 2 shows in a more detail a top view of a robotic cleaning device of the robotic cleaning kit according to the invention with some parts removed.
Figure 3:
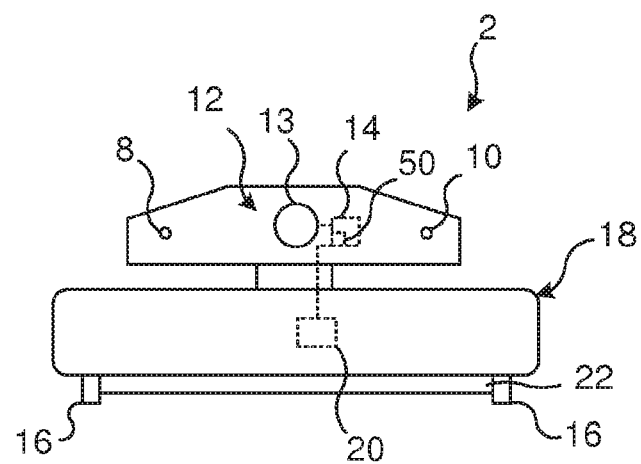
FIG. 3 shows a front view of a robotic cleaning device of the robotic cleaning kit according to the invention.

The robotic cleaning device 2 comprises an obstacle detecting device in the form of 3D sensor comprising a first and a second line laser 8, 10, which may be horizontal or vertical line lasers and a camera device 13. The robotic cleaning device may further comprise a processing unit 14, a propulsion system 20 comprising a driving wheel 16, a body 18 and a cleaning member 22, as best illustrated in FIGS. 2 and 3. The first and second line lasers 8, 10 may preferably be vertical line lasers 8, 10 and they are arranged adjacent but offset of the camera device 13 and configured to illuminate a height and a width that is greater than the height and width of the robotic cleaning device 2. Further, the angle of the camera device 13 is smaller than the space illuminated by the first and second line lasers 8, 10 to make sure that the camera device 13 is optimally used. The camera device 13 is configured to take and record a plurality of images per second. Data from the images, i.e. data obtained by the obstacle detecting device from the vicinity of the robotic cleaning device, may be extracted by the processing unit 14 and the data may be saved on an electronic storage medium 50 which is connected or integrally formed with the processing unit 14.

The propulsion system 20 may, alternatively to the driving wheel 16, comprise crawlers or even a hoover craft system.

The cleaning member 22 may comprise a brush roll, a floor mop, a cleaning opening. In the case the robotic cleaning device 2 is a robotic cleaning device, the cleaning member 22 may further comprise a suction fan connected to the cleaning opening.

The propulsion system 20 the robotic cleaning device 1, as best illustrated in FIG. 2, comprises two driving wheels 16. The driving wheels 16 may be configured to be moved independently form each other via drives 11, 11' of the propulsion system 20. Each of the driving wheels 16 may comprise a drive 11, 11'. The propulsion system 20 and thus the two the drives 11, 11' may be connected to the processing unit 14 or control means. Each drive 11, 11' may further include a suspension and a gear box for the according driving wheel 16.

The first and second vertical line laser 8, 10 are configured to scan, preferably vertically scan, the vicinity of the robotic cleaning device 2, normally in the direction of movement of the robotic cleaning device 2. The first and second line lasers 8, 10 are configured to send out laser beams, which illuminate furniture, walls and other objects of a home or room. The 3D sensor system 12 and the camera device 13, respectively, takes and records images and the processing unit 14 may create an image or layout of the surroundings the robotic cleaning device 2 is operating in, by putting the pieces together and by measuring the distance covered by the robotic cleaning device 2, while the robotic cleaning device 2 is operating. The robotic cleaning device 2 is thus configured to learn about its environment or surroundings by operating/cleaning.

With reference to FIG. 3, the processing unit 14 embodied in the form of one or more microprocessors is arranged to execute a computer program downloaded to a suitable storage medium 50 associated with the microprocessor, such as a Random Access Memory (RAM), a Flash memory or a hard disk drive. The processing unit 14 is arranged to carry out a method according to embodiments of the present invention when the appropriate computer program comprising computer-executable instructions is downloaded to the storage medium 50 and executed by the processing unit 20. The storage medium 50 may also be a computer program product comprising the computer program. Alternatively, the computer program may be transferred to the storage medium 50 by means of a suitable computer program product, such as a digital versatile disc (DVD), compact disc (CD) or a memory stick. As a further alternative, the computer program may be downloaded to the storage medium 50 over a network. The processing unit 14 may alternatively be embodied in the form of a digital signal processor (DSP), an application specific integrated circuit (ASIC), a field-programmable gate array (FPGA), a complex programmable logic device (CPLD), etc.

With respect to FIG. 3, for illustrational purposes, the obstacle detecting device and the 3D sensor system 12 is separated from the main body 18 of the robotic cleaning device 2. However, in a practical implementation, the 3D sensor system 12 is likely to be integrated with the main body 18 of the robotic cleaning device 2 to minimize the height of the robotic cleaning device 2, thereby allowing it to pass under obstacles, such as e.g. a sofa.

Figure 1:
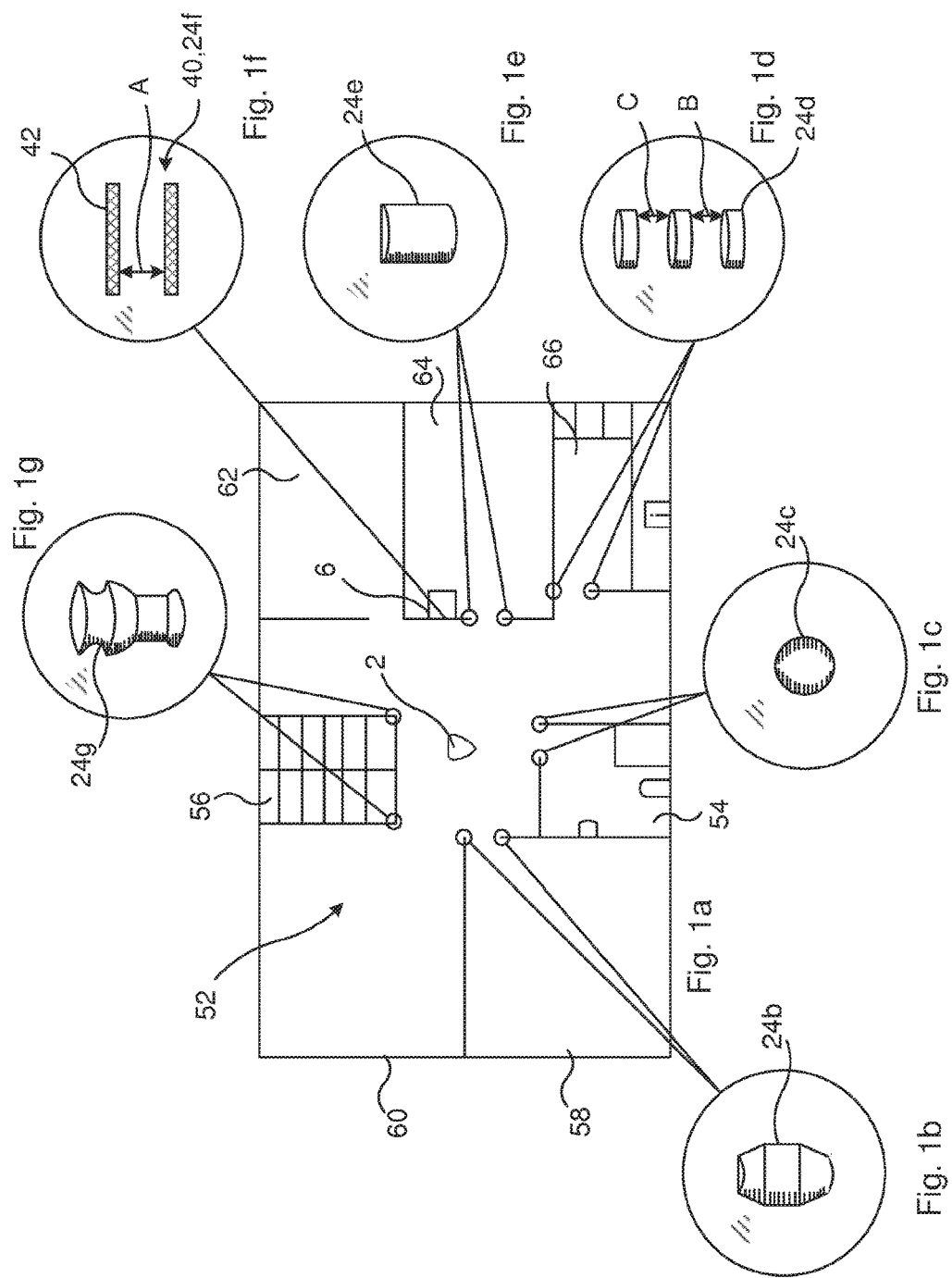
FIG. 1a shows a surface with an installed robotic cleaning kit comprising a robotic cleaning device according to the invention.
FIGS. 1b to 1g show enlarged portions of FIG. 1a illustrating various types of different artificial vertical markers that may be used in the robotic cleaning kit together with a robotic cleaning device according to the invention.

The modular vertical marker set 4 comprises a plurality of various types of artificial markers 24b-24g. The modular vertical marker set 4 may comprise a plurality of pairs of identical types of markers 24b-24g, which pairs of identical types of vertical markers 24b-24g may be installed on either side of a doorframe that leads into a room, as illustrated in FIG. 1a. It may be advantageous for the orientation of the robotic cleaning device 2 to install two markers 24b-24g on either side of a doorframe; it is however also possible to have only one vertical marker 24b-24g installed next to a doorframe or on the doorframe.

The robotic cleaning device 2 and its processing unit 14, respectively, may recognize and store at least one feature or characteristic, created when the various types of vertical markers 24b-24g are illuminated by the first and second laser 8, 10. The first and second lasers 8, 10 are however not necessary to generate said feature, it is possible to derive a feature from a marker 24b-24g or other object within a surface 52 to be cleaned, without the first and second laser 8, 10. The feature comprises data that is extracted from an image that is generated when the 3D sensor system 13 takes pictures while the robotic cleaning device 2 is moving around. This is best illustrated in FIG. 1a. The robotic cleaning device 2 is thus configured to learn, recognize and store the various features of its environment. The installed markers 24b-24g when they are mounted against a wall.

Preferably a plurality of features may be extracted and stored from each of the vertical markers 24b-24g. The more features or characteristics are derived from a vertical marker 24b-24g, the better can the robotic cleaning device recognize and identify the artificial marker 24b-24g.

In order to teach the robotic cleaning device 2 to record and recognize the various markers 24b-24g and their feature, the robotic cleaning device 2 may be positioned in front of a vertical reference surface and then a user may temporarily install the markers 24b-24g, one after the other. An image of each type of marker 24b-24g is then taken by an obstacle detecting device, the image is analysed and at least one feature is attained and stored in a database, which for example is located on the storage medium 50. The attained feature stored in the database is forming a stored feature. Thus each different type of marker 24b-24g has at least one associated stored feature in the database. There may be more than one stored feature in the database for each different type of marker 24b-24g.

The processing unit 14 may comprise a user interface 44, as illustrated in FIG. 2. The user interface 44 may be configured to allow a user to enter a specific name for each of the various types of markers 24b-24g and their assigned room or area, right after the scanning on the reference surface, so that a user may install the marker 24b-24g after the reference scanning at the entrance to the corresponding named room or area, which is assigned to the installed marker 24b-24g.

For example, the user may want to name and flag the kitchen to the robotic cleaning device 2, therefore a specific pair of or one specific marker 24b-24g is temporarily installed on the vertical reference surface, then scanned and the feature is recorded by the robotic cleaning device 2, then the name of the room or area associated with the specific marker and its feature or pair of vertical markers 24 as well as instructions regarding what to do when the specific stored feature is recognized may be typed into the user interface 44 and saved by the processing unit 14. After that, as a last step, the specific pair or one of the specific markers 24b-24g may be installed at the entrance to the kitchen. When the robotic cleaning device 2 is now set to a cleaning mode to clean the surface 52 it will record images, derive and attain features from the images and compare those attained features with stored features from the database. When the attained feature matches the stored feature for "kitchen", the robotic cleaning device 2 will perform according to instructions assigned to the specific stored feature for "kitchen". The user may have decided that the kitchen should not be cleaned (instruction), and the robotic cleaning device 2 will thus turn away or go back when an attained feature matches the stored feature for "kitchen". The present invention thus allows telling or teaching the cleaning robotic cleaning device 2 not to enter the kitchen or clean the kitchen only at a certain time of the day etc. The method and the robotic cleaning device also enable the user to set and mark no-go areas such as staircases or other thresholds.

After a certain time of operating, the robotic cleaning device 2 will also remember where the stored feature and thus the installed markers 24b-24g are positioned within the cleaning surface 52 and the map build up by the robotic cleaning device 2 itself.

The robotic cleaning device 2 may be configured, among others, to work in the teaching or learning mode and in the cleaning mode. Thus after the above described teaching process, which is done in a teaching mode, the robotic cleaning device 2 may be switched to the cleaning mode in which it autonomously starts to operate and clean the surface 52, whereby it will recognize the different markers 24b-24g and their corresponding feature taught, said markers being now placed at the entrance to the correspondingly named room or area as best illustrated in FIG. 1a.

FIG. 1a illustrates the exemplary surface 52 of a home comprising various rooms or areas, such as a toilet 54, staircase 56, a first bedroom 58, a second bedroom 60, a third bedroom 62, an office 64 and a kitchen 66. Each of the mentioned rooms, is marked by a pair of one type of a special marker 24b, 24c, 24d, 24e, 24f, 24g, as illustrated in FIGS. 1b, 1c, 1d, 1e, 1f, 1g. Since each of the pair of different types of markers 24b, 24c, 24d, 24e, 24f, 24g and its typical in feature has been shown and taught to the robotic cleaning device 2, the robotic cleaning device 2 will recognize the pairs of vertical markers 24b, 24c, 24d, 24e, 24f, 24g and, for example not proceed further when it spots the special half-round 3 dimensional shape of the specific vertical marker 24g used to mark the area "staircase" in FIG. 1g. As can be seen from FIGS. 1b to 1g, each of the unique different markers 24b, 24c, 24d, 24e, 24f, 24g has a 3-dimensional (3D) shape and is at least partially symmetric in view of a vertical plane comprising a centre axis A of the vertical markers and oriented perpendicular to a surface defined by a wall 68 on which the marker 24b, 24c, 24d, 24e, 24f, 24g is installed.

All the makers 24b, 24c, 24d, 24e, 24f, 24g illustrated in FIGS. 1b to 1g comprise a partially circular shape, besides the unique charging station marker 40, 24f, illustrated in FIG. 1f, which will be described later herein. The markers 24b, 24c, 24d, 24e, 24g illustrated in FIGS. 1b, 1c, 1d, 1e and 1g comprise partially circular shapes which look the same when installed on a wall 68 and when observed from various positions from the floor. Thus no matter in what angle the robotic cleaning device 2 approaches a specific marker 24b, 24c, 24d, 24e, 24g, the signature created by the vertical line lasers 8, 10 will be the same or at least very similar so that the robotic cleaning device 2 knows which specific marker 24b, 24c, 24d, 24e, 24g is in front of it.

FIG. 1b illustrates a specific marker 24b comprising top and bottom segments in form of truncated cones and a cylindrical middle segment. The marker 24b as illustrated is cut in half along the central vertical axis, however it could also be cut along a vertical plane that does not extend through the center axis A, same is valid for the markers 24c, 24d, 24e, 24g shown in FIGS. 1c, 1d, 1e and 1g.

FIG. 1c illustrates a specific marker 24c, that consists of a cut ball-shape. As mentioned the ball shape may be cut in half but it may be cut along a plane that is arranged eccentric to the centre of the ball.

FIG. 1d illustrates a specific marker 24d, which comprises of three disc segments placed in a known vertical distance B, C from each other. By varying the vertical distances B, C between the disc segments, it is possible to create various different types of markers 24d from the embodiment shown in FIG. 1d alone. This becomes even clearer when one realizes that the robotic cleaning device 2 is able to measure and thus recognize distances between the disc segments. The vertical distances B, C can be the same or they can differ from each other. In case the vertical distance are not the same, these two different distance B, C create two different features from the artificial marker 24d.

FIG. 1e illustrates a specific marker 24e, which may be a cylinder segment. As mentioned above the cylinder segment may be a half-cylinder or it may be cut along a plane that does not extend through the center axis.

FIG. 1g illustrates a further embodiment of a specific marker 24g comprising a center axis A to which center axis the marker 24g is at least in one direction symmetric. The marker 24g illustrated in FIG. 1g is quite specific and has a special shape.

FIG. 1f illustrates a specific unique charging station marker 40, comprising two reflective elements 42 in the form of stripes. Since the robotic cleaning device 2 is configured to remember and store the position of the charging station 6, which in the example of FIG. 1a is located in the office 64, the unique charging station marker 40 is, among others, also configured to show and guide the robotic cleaning device 2 into the charging station 6. Due to the use of reflective elements 42, the signature and the attained at least one feature thereof is special and easily recognizable by the processing unit 14 and the camera, respectively of the robotic cleaning device 2. The two reflective elements 42 are arranged with a vertical offset A. This offset may be in the range of 1 to 10 cm.

The unique charging station marker 40 may be positioned either directly on the charging station 6 or it may be positioned at least in close proximity to the charging station 6. Positioning the unique charging station marker 40 on the charging station 6 may have the advantage that this could be done directly in the factory side prior to selling the robotic cleaning kit 1 and that in case the charging station 6 is moved to another place within the surface 52 to be cleaned, the unique charging station marker 40 follows and the robotic cleaning device 2 finds the charging station 6.

Since the robotic cleaning device 2 now knows each room or area basically by name, the user can adjust, control and program the whole cleaning process. It may even be possible to tell the robotic cleaning device 2 when to clean which room or area via the interface 44. For example the user may be able to tell the robotic cleaning device 2 that the kitchen 66 should be cleaned after preparation of the meal. Since the robotic cleaning device 2 learned and stored the layout of the cleaning surface 52 and thus knows where the kitchen is located, as illustrated in FIG. 1*d*, the robotic cleaning device 2 performs the cleaning operation after the programmed point in time. The various types of markers 24*b*-24*g* thus help the robotic cleaning device 2 to navigate and they also improve the navigation of the robotic cleaning device 2 on the surface 52 to be cleaned.

The various types of markers 24*b*, 24*c*, 24*d*, 24*e*, 24*f*, 24*g* are configured to be glued or stuck to the wall 68, preferably lower than the light switches close to the electric sockets.

However, the different markers 24*b*-24*g* do not need to be configured to be stuck or glued to the wall 68. The various types of different markers 24-24*g* may be configured to be standing freely in the room and may thus be everyday articles such as candle holders 32, hallstands, vases with special shapes that can be recognized by the robotic cleaning device 2 or special objects like chess figures (pawn 28, queen or rook), which may also be recognized by a robotic cleaning device 2. When freely standing objects are used as markers 24*b*-24*g* for the robotic cleaning device 2, there is however, a slight risk that they may be moved around by a person and that they then may confuse the robotic cleaning device 2.

The various types of different markers 24*b*-24*g* have a height profile which creates a specific vertical signature, when the vertical markers 24*b*-24*g* are illuminated by the vertical line lasers 8, 10.

In addition, the various types of different vertical markers 24*b*-24*g* do not require any electric or other power and are configured to work as passive markers that can be easily installed and positioned without additional accessories.

Various bar codes may also be used as markers 24*b*-24*g*, as illustrated in FIG. 4. The bar codes may be configured to be glued or stuck to a wall, like the specific markers illustrated in FIGS. 1*b* to 1*g*. If bar codes are used, the obstacle detecting device should comprise line lasers 8, 10.

FIG. 4 illustrates the robotic cleaning kit 1 comprising the charging station 6 configured to be connected to an electric socket via a plug, the robotic cleaning device 2 and a modular set of various markers 4. The modular set of various markers 4, exemplary illustrated in FIG. 4, comprises the candle holder 32, the pawn 28, some kind of a lego piece 70 and a cylinder 76. Since the modular set of various markers 4 is configured to be modular a plurality of modular sets of various markers 4 may be designed and used, some of the sets may comprise pairs of specific types of different markers 24*b*-24*g*. The user of the robotic cleaning kit 1 may always buy additional types of vertical markers 24*b*-24*g* if needed.

The invention has now been described by a robotic cleaning device 2 comprising vertical line lasers 8, 10, which may vertically scan various types of markers 24*b*-24*g*.

It is also possible and falls within the scope of the invention to use horizontal line lasers and various types of horizontal markers, which extend in a horizontal direction and which have a specific horizontal profile.

The robotic cleaning kit 1 has now been described using a few of the almost indefinite amounts of various types of markers 24*b*-24*g*. Many shapes or types of vertically extending and at least partially or completely symmetric objects may fulfil the requirements to function as a specific type of marker 24*b*-24*g*. One of the only limiting requirements to a marker 24*b*-24*g* may be that it is easily portable by a person. The different markers 24*b*-24*g* may be various types of vertical markers 24*b*-24*g* which have a specific vertical signature along their height.

The embodiment according to the invention has now been described by using markers 24*b*-24*g* to generate the stored and attained features. Due to the capability of the obstacle detecting device and the processing unit 14 of the robotic cleaning device 2 it is however possible to teach the robotic cleaning device 2 the surface 52 and its areas and rooms to be cleaned by using common objects that can be found in a home, as markers (not illustrated). The staircase 56 for example, has quite a special shape in a home and may be easily recognizable by the robot 2 without using markers 24*b*-24*g*. Same is valid for other rooms, such as the kitchen with the stove as potential marker 24*b*-24*g*, etc.

Thus the scope of the invention is not limited to markers 24*b*-24*g* as shown in the figures and as described herein. The markers may incorporate any suitable object or shape arranged or positioned in the area to be cleaned. Examples for such markers may be vases, TV-screens, furniture, lamps, bathtubs, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic cleaning device comprising:
   a body,
   a single obstacle detecting device configured to obtain 3-dimensional (3D) data from a vicinity of the robotic cleaning device;
   a propulsion system configured to drive the robotic cleaning device across a surface to be cleaned;
   a cleaning member; and
   a processing unit arranged to:
      create or update a 3D map of surroundings of the robotic cleaning device by:
         determining, from the 3D data, a 3D shape of an object, and extracting and attaining at least one feature from the 3D shape obtained by the obstacle detection device at a first location of the robotic cleaning device, and
         storing, in a database, the at least one feature from the 3D shape with other stored features of the 3D data obtained by the obstacle detection device at other locations of the robotic cleaning device as part of the 3D map, deduce a position of the robotic cleaning device within the 3D map by:
comparing the at least one attained feature with one or more predetermined features from the database, and
when the at least one attained feature matches one of the one or more predetermined features, deduce the position of the robotic cleaning device in the 3D map and controlling the robotic cleaning device to navigate using the 3D map based on the deduced position.

2. The robotic cleaning device according to claim 1, wherein the obstacle detection device comprises a 3D sensor system.

3. The robotic cleaning device according to claim 2, wherein the 3D sensor system comprises:
a camera device configured to record images of a vicinity of the robotic cleaning device; and
first and second vertical line lasers configured to illuminate the vicinity of the robotic cleaning device;
wherein the processing unit is configured to deduce the position of the robotic cleaning device from the recorded images.

4. The robotic cleaning device according to claim 1, wherein the at least one feature is attained from at least two reflective elements having a predetermined vertical offset.

5. The robotic cleaning device according to claim 4 wherein the vertical offset is in the range of 1-10 centimeters.

6. The robotic cleaning device according to claim 1, wherein the at least one feature is attained from a vertically arranged bar code.

7. The robotic cleaning device according to claim 3, wherein the camera device is configured to record images of 3D object markers and derive a position of the 3D object markers and attain at least one feature from at least one of the markers.

8. The robotic cleaning device according to claim 7, wherein the processing unit has a user interface configured to receive input from a user regarding at least one attained feature derived from at least one of the 3D object markers, in order to generate a stored feature.

9. The robotic cleaning device according to claim 4 wherein the vertical offset is in the range of 2-6 centimeters.

10. The robotic cleaning device according to claim 4 wherein the vertical offset is 3 centimeters.

11. A method of teaching a robotic cleaning device comprising the steps of:
instructing, via an interface, the robotic cleaning device to enter a learning mode;
capturing, by a camera of the robotic cleaning device, during the learning mode, three dimensional (3D) images of artificial markers;
analyzing, by a processor of the robotic cleaning device, the 3D images, determining a 3D shape of each of the artificial markers, and deriving a feature from the 3D shape of each of the artificial markers;
storing, by the processor of the robotic cleaning device, the feature from each of the artificial markers in a database;
assigning, via the interface, the stored feature from each of the artificial markers to a respective area where the robotic cleaning device navigates;
positioning the artificial markers in the respective areas to which they are assigned;
programming, via the interface, the robotic cleaning device with navigation instructions assigned to each of the artificial markers; and
instructing, via the interface, the robotic cleaning device to enter a cleaning mode, where navigation of the robotic cleaning device is performed by recognizing the 3D shape of the artificial markers, comparing the 3D shape of the recognized artificial markers with the features stored in the database, and executing the respective navigation instructions.

12. A method of operating a robotic cleaning device comprising the steps of:
obtaining 3-dimensional data (3D) data from a vicinity of the robotic cleaning device by an obstacle detecting device;
creating or updating, by a processing unit, a 3D map of surroundings of the robotic cleaning device by:
determining, from the 3D data, a 3D shape of an object,
extracting at least one feature from the 3D shape obtained by the obstacle detection device at a first location of the robotic cleaning device, and
storing, in a database, the at least one feature from the 3D shape with other stored features of the 3D data obtained by the obstacle detection device at other locations of the robotic cleaning device as part of the 3D map,
controlling, by the processing unit, the operation of the robotic cleaning device by:
comparing the at least one attained feature with predetermined features from the database; and
when the at least one attained feature matches one of the predetermined features, deducing the position of the robotic cleaning device in the 3D map, and controlling the robotic cleaning device to navigate using the 3D map based on the deduced position.

13. The method according to claim 12, wherein the data is generated by a camera device in the form of an image.

14. The method according to claim 12, further comprising the step of installing different types of markers in proximity to entrances to different rooms, the robotic cleaning device being configured to recognize and attain features and a position from at least one of the installed markers and perform an operation according to instructions assigned to the known feature of the at least one type of marker.

15. The method according to claim 12, further comprising the steps of installing a charging station and a unique charging station marker in proximity to the charging station, and directing the robotic cleaning device to the charging station using the unique charging station marker.

16. The method according to claim 12, further comprising the step of programming a processing unit of the robotic cleaning device via an interface so that only some or one of specific areas or rooms are cleaned at a time.

17. A robotic cleaning kit comprising a robotic cleaning device according to claim 1 and a set of 3D object markers.

* * * * *